United States Patent [19]
Blank

[11] 3,768,728
[45] Oct. 30, 1973

[54] FAIL-SAFE THERMOSTATIC MIXING VALVE

[75] Inventor: William J. Blank, Bayside, N.Y.

[73] Assignee: International Telephone and Telegraph Corporation, Nutley, N.J.

[22] Filed: Mar. 27, 1972

[21] Appl. No.: 238,551

[52] U.S. Cl. .................................. 236/12 R, 236/99
[51] Int. Cl. ............................................ G05d 11/16
[58] Field of Search ..................... 236/12 R, 99, 100

[56] References Cited
UNITED STATES PATENTS

| 2,657,860 | 11/1953 | Schmidt et al. | 236/12 |
| 2,828,075 | 3/1958 | Panza et al. | 236/12 |
| 2,911,153 | 11/1959 | Pett | 236/99 X |

Primary Examiner—William E. Wayner
Attorney—C. Cornell Remsen, Jr. et al.

[57] ABSTRACT

A fail-safe thermostatic mixing valve including a valve casing having a cold water inlet port, a hot water inlet port, and a mixed water outlet port. A thermostat controlling the proportions of said hot and cold water, thereby regulating the temperature of said mixed water is positioned within said casing. A reciprocating piston is coupled to said thermostat and a hot seat disc is coupled thereto for controlling the input flow of said hot water. In the event of thermostat failure a hollow cylindrical piston, coupled to said hot seat disc and positioned to channel the hot water passed thereby to said mixed water outlet port is moved by a spring coupled between said hot seat disc and the valve casing causing one end of said hollow cylindrical piston to abut a mixed water seat disc thereby preventing the passage of hot water therethrough to said mixed water outlet port notwithstanding the fact that the hot water seat disc no longer prevents the input flow of said hot water. Additionally, the hollow cylindrical piston is positioned adjacent the cold water inlet port so that the movement of said cylindrical piston to prevent the passage of hot water therethrough also seals the cold water inlet port, thereby preventing the flow of any water out of the mixed water outlet port.

8 Claims, 2 Drawing Figures

PATENTED OCT 30 1973
3,768,728
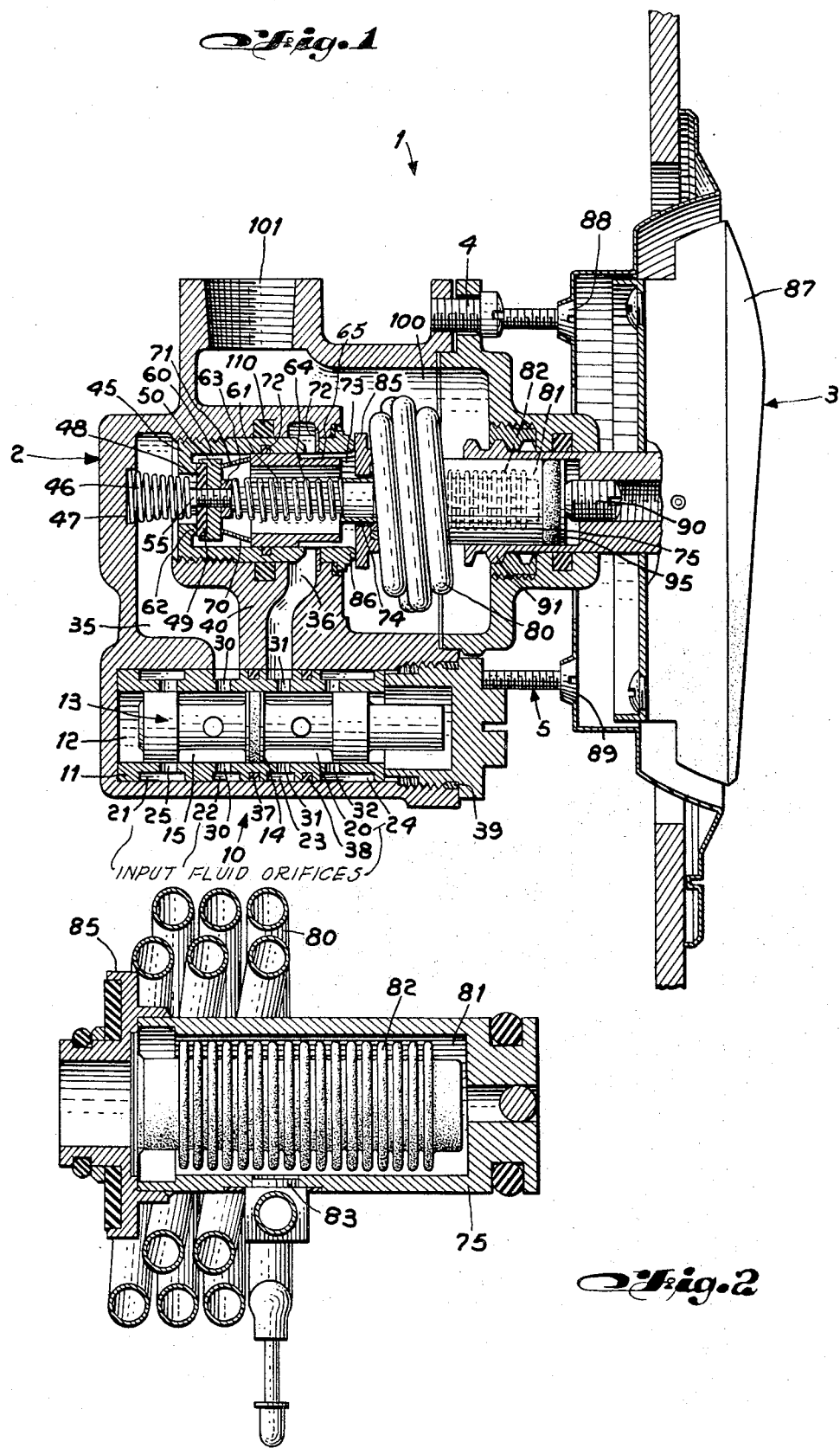

3,768,728

FAIL-SAFE THERMOSTATIC MIXING VALVE

BACKGROUND OF THE INVENTION

This invention relates to thermostatic anti-scald mixing valves for fluids and more particularly to such a mixing valve which automatically closes in the event of failure of the thermostat.

Fail-safe thermostatic mixing valves may be used in, for example, institutional shower facilities such as hospitals and homes for the aged. They would be extremely useful in this application due to the fact that most thermostatic mixing valves utilized today will, when the thermostat fails, move to the full open position thereby allowing scalding water to be transmitted through the shower head and it is obvious that unlike healthy bathers, institutional users, who are frequently feeble due to either age or debilitating disease, are incapable of the rapid movement required to escape being burned by said scalding water. The purpose of the fail-safe mixing valve is thus apparent and it is designed to insure that in the event of thermostat failure the valve will move to the closed position thereby preventing the provision of any water, hot or cold, through the shower head and into contact with the bather. The thermostatic shower mixing valves presently known in the art are, however, unsatisfactory in that many of them are susceptible to being manually over-ridden. Thus, after thermostat failure and valve closure the maintenance personnel at the hospital or home for the aged where the valves are being utilized may, rather than replace the failed thermostat which is frequently not immediately available, manually adjust the system so that a bath in progress may be completed or so that shower facilities may be available until spare parts are received. This, of course, results in the use of a shower valve which is no longer thermostatically controlled but rather one in which the temperature must be continually manually adjusted as water temperatures and pressures vary. More importantly, if the resulting valve is one which no longer has a fail-safe feature and the temperature of the hot water provided to the valve suddenly rises or, as is more frequently the case, the volume of cold water provided to the valve suddenly decreases due to the sudden tapping at some other portion of the facility of some of the total cold water supply available, the water transmitted through the shower head will suddenly become extremely hot thereby risking serious injury to the bather.

SUMMARY OF THE INVENTION

Therefore the main object of this invention is to provide an improved fail-safe thermostatic mixing valve.

It is a further object of this invention to provide such a mixing valve which cannot be manually over-ridden.

It is a feature of this invention that the failure of the thermostat in the subject mixing valve will cause the complete cessation of fluid flow through said valve.

According to the present invention there is provided a thermostatically controlled valve comprising a valve body formed with a fluid input orifice and a fluid output orifice, temperature sensing means positioned within said body for sensing the temperature of fluid adjacent said output orifice, first sealing means coupled to said temperature sensing means, first piston means coupled at a first end thereof to said temperature sensing means and adapted to be moved reciprocally thereby in response to fluid temperature variations sensed by said sensing means, second sealing means coupled to said first piston means at a second end thereof and adapted to prevent fluid flow between said input and output orifices in response to movement of said first piston in a first direction and to allow fluid flow between said input and output orifices in response to movement of said first piston in a second direction opposite said first direction, second piston means coupled to said second sealing means and positioned between said first and second sealing means, said second piston means being formed with a fluid flow path therein and adapted to receive the fluid passed by said second sealing means at one end thereof and to emit said passed fluid at a second end thereof, and drive means coupled to said second sealing means adapted to urge said second piston means in said second direction to abut said first sealing means upon failure of said sensing means, thereby preventing the emission of said passed fluid from said second end of said second piston means.

Further objects and features of this invention will become more apparent by reference to the following description taken in conjunction with the accompanying drawings, in which:

BRIEF DESCRIPTION OF THE DRAWINGS

FIG. 1 illustrates a cross-sectional view of the structure according to the instant invention; and FIG. 2 is a cross-sectional view of the thermostat used in the structure illustrated in FIG. 1.

DESCRIPTION OF THE PREFERRED EMBODIMENTS

Turning now to FIGS. 1 and 2 there is illustrated a valve body 1 formed from fluid portion 2 and cover portion 3, portions 2 and 3 being held together after assembly by bolts 4 and 5. Fluid portion 2 contains a balancing section 10 which includes a shuttle cylinder 11 having formed therein a chamber 12 and a shuttle 13 positioned in said chamber 12. The shuttle 13 has an O-ring 14 positioned intermediate the ends thereof forming a "hot" fluid chamber 15 and a "cold" fluid chamber 20. Fluid to valve 1 is provided through ports 21, 22, 23 and 24, ports 21 and 24 being annular, formed in shuttle cylinder 11 by a source of fluid, not illustrated. Ports 21–24 have annular ports 25, 30, 31 and 32 respectively projecting therefrom, ports 25 and 30 providing a flow path between ports 21 and 22 and chamber 15 and ports 31 and 32 providing a fluid flow path between ports 23 and 24 and chamber 20. It will be seen that ports 21, 25, 30, 31, 24, and 32 are annular and that ports 30 and 31 provide a fluid flow path between chambers 15 and 20 respectively and chambers 35 and 36 respectively formed in fluid portion 2. O-rings 37, 38, and 39 are provided as required to prevent leakage between portions of shuttle cylinder 11 and the atmosphere.

Positioned within valve body 1 is the fail-safe thermostat assembly which will now be discussed. Structural member 40 is rigidly positioned relative to shuttle cylinder 11 to appropriately position liner 45. One end of a valve spring 46 is positioned in an indent 47 formed in fluid body portion 2, the other end of spring 46 fitting within an orifice 48 formed in liner 45. A hot seat disc 49, or sealing means, together with its metal backing disc 50 and disc holding nut 55, is positioned in chamber 60 formed in liner 45. Nut 55 is threaded onto piston screw 61 and is of sufficient diameter relative to the inner diameter of spring 46 so that spring 46 will urge hot seat disc 49 off shut-off seat 62 formed by the in-turned shoulders of liner 45 at orifice 48. A retaining ring 63, holding metal backing disc 50 in place, is provided adjacent said backing disc and force is applied to said retaining ring 63 by relief spring 64 surrounding said piston screw 61. The force applied by relief spring 64 urges said hot seat disc 49 in a direction toward shut-off seat 62, that is, it urges said hot seat disc in a direction opposite to that direction in which the hot seat disc is urged by valve spring 46.

Metal backing disc 50 is rigidly connected to piston 65 by, for example, a pair of struts 70 and 71 so that movement of hot seat disc 49 and its metal backing disc 50 causes equal movement of piston 65. Piston 65 comprises first piston means. Piston 65 is a hollow cylinder and is formed with an annular shoulder 72, the outer diameter of the larger portion of said piston being equal to the inner diameter of liner 45, while the smaller outer diameter of piston 65 is somewhat less. Chamber 36 is annular and as piston 65 moves reciprocally it is seen that fluid in chamber 36 is allowed to flow into chamber 73 when piston 65 moves to the left and fluid flow from chamber 36 to chamber 73 is cut off as piston 65 moves to the right due to the sealing action of the larger outer diameter portion of piston 65 against the inner diameter portion of liner 45. A push-rod, or rod means, 74 is connected to the end of piston screw 61 opposite hot seat disc 49 and extends into thermostat body 75, the thermostat being illustrated in greater detail in FIG. 2. A copper tube 80 filled with a thermosensitive liquid such as one of the Freons, for example F–113, surrounds the left side portion of thermostat body 75. The interior of copper tube 80 is fluidly coupled, via port 83, to chamber 81 formed in thermostat body 75 which is thus also filled with said thermosensitive liquid, and a corrugated metal bellows 82, enclosing one of push-rod 74 and connected at the other to thermostat body 75 is also positioned within thermosensitive liquid filled chamber 81.

An annular outlet disc 85 coupled to thermostat body 75 surrounds push-rod 74 at the end thereof connected to piston screw 61 and is arranged to move into and out of contact with annular outlet seat 86 formed as part of liquid portion 2. Outlet seat disc 85, which may be made of a compressible material such as neoprene, is moved into and out of contact with outlet seat 86 by rotation of handle assembly 87, dial plate screws 88 and 89 and spindle 91. Outlet seat disc 85 may also be moved relative to outlet seat 86 by means of adjustment screw 90, the thermo-sensitive liquid within chamber 81 being prevented from leaking into the area of adjustment screw 90 and handle assembly 87, by means of O-ring 95. The outlet seat disk 85 comprises first sealing means. Outlet seat disc 85, copper tube 80, and a portion of thermostat body 75 are positioned in output chamber 100 formed in fluid portion 2 of valve body 1. A fluid output port 101 is provided in fluid portion 2, said output port 101 being connected to some form of utilization device, for example, a shower head, not shown.

Turning now to the operation of the subject fail-safe thermostatic valve, it will be seen that with the handle assembly 87 turned down, output seat disc 85 presses against output seat 86 thereby preventing the flow of fluid or liquid into chamber 100 and out of port 101.

Further, relief spring 64 is compressed and overcomes the opposing force of valve spring 46 thereby causing hot seat disc 49, which may be made of a compressive material such as neoprene rubber, against hot seat 62. When the instant valve is used as part of a shower unit, hot water enters the valve via ports 21 and 22, past the balancing section 10, through port 30 and into chamber 35 while the cold water enters the valve through ports 23 and 24, past balancing unit 10 and through port 31 into chamber 36. Balancing section 10, including shuttle cylinder 11 and shuttle 13, operates on an equal pressure principle, the shuttle 13 reciprocating in response to unequal input fluid pressures in a manner well known in the art. Thus, in the view illustrated, it will be seen that the hot water pressure is greater than the cold water pressure from the external supply and therefore shuttle 13 has moved to the right thereby closing port 25 and allowing hot water to flow into chamber 15 only through ports 22 and 30 while the cold water enters chamber 20 via both ports 31 and 32. It is thus seen that when handle assembly 87 is tightened down the hot water in chamber 35 cannot flow past hot seat disc 49 but that cold water is chamber 36 past hot seat disc 49 but that cold water is chamber 36 can flow past annular shoulder 72 of piston 65, the cold water flowing up to output seating disc 85 where it is stopped. As handle assembly 87 is rotated slightly in a releasing manner, that is, from its off position to its cold position, output seating disc 85 leaves output seat 86, allowing the cold water in chamber 36 to flow into chamber 100 and then out through port 101. At this time, however relief spring 64 is still under compression overcoming the force of valve spring 46 and therefore hot seat disc 49 still presses against hot seat 62 preventing the flow of water from chamber 35 into chamber 60. As handle assembly 87 is rotated further in an opening manner, that is, from cold to hot, compression spring 64 is relieved and valve spring 46 forces hot seat disc 49 off hot seat 62 allowing hot water from chamber 35 to flow into chamber 60 formed in liner 45 and through the interior of hollow cylinder piston 65 to chamber 73. Due to the fact that liner 45 is rigidly connected to hot seat backing disc 50 by struts 70 and 71, and piston 65 is reciprocally movable within chamber 60, it will be seen that as hot seat disc 49, piston screw 61, and piston 65 move from left to right, the larger outer diameter portion of piston 65 begins to close the opening between chamber 36 and chambers 73 and 100 thereby preventing the flow of cold water from chamber 36 into chamber 100. Thus, it is seen that as the flow of hot water past hot seat disc 49 increases, raising the temperature of the liquid in chamber 100, the flow of cold water into chamber 100 decreases thereby contributing to the increased temperature of the mixed fluid and indicating that a constant volume of water will be transmitted through port 101, the volume of cold water decreasing as the volume of hot water increases and vice versa.

The temperature of the mixed water flowing out of output port 101 is controlled by the thermostat unit illustrated most clearly in FIG. 2, which maintains the temperature of the output water constant after it has been set by adjustment screw 90 and handle assembly 87. The temperature of the mixed water in chamber 100 surrounds copper tubing 80 which is, as previously stated, filled with a thermo-sensitive liquid as is chamber 81 within thermostat body 75. As the temperature of the mixed water in chamber 100 increases, the thermo-sensitive liquid expands acting upon bellows 82 which is not filled with said thermo-sensitive fluid, to compress it and therefore the end of bellows 82, in contact with the end of push-rod 74, urges the push-rod from right to left, thereby decreasing the flow of hot water past hot seat disc 49 due to the movement of disc 49 toward hot seat 62 and increasing the flow of cold water from chamber 36 due to the movement from right to left of piston 65 which decreases the portion of chamber 36 blocked by the larger outer diameter portion of piston 65. It is understood, of course, that the opposite movement of push-rod 74, piston 65 and hot seat disc 49 will take place if the temperature of the mixed water in chamber 100 decreases and that copper tubing 80 and output seat disc 85 remain stationary regardless of push-rod motion, the movement of output seat disc 85 and copper tubing 80 being controlled solely by adjustment screw 90 and handle assembly 87. As the structure and operation of this type of thermostatic unit, that is, that portion comprising push-rod 74, copper tubing 80, output disc 85 and bellows 82 are well known in the art, it being of the type manufactured by ITT Lawler, Inc., a corporation having its main offices in Mt. Vernon, N.Y., under the trade name "Echelon," it is not believed that further explanation of the operation of the thermostat unit is necessary.

Turning now to the fail-safe feature of the instant thermostatic mixing valve, it is well known that the primary failure of thermostatic valves is due to the rupturing of the corrugated metal bellows due to metal fatigue caused by repeated flexing, which results in the leakage of the thermo-sensitive fluid out of chamber 81 and copper tubing 80. If this occurs there is no contracting and expanding thermo-sensitive fluid available to cause contraction and expansion of bellows 82 and thus there is no temperature responsive reciprocating movement of push-rod 74. The push-rod of the thermostat is thus incapable of controlling the movement of piston screw 61 and this in turn prevents control of the hot and cold fluid flow. In the instant invention, however, failure of the thermostat occasioned by, for example, rupturing of the bellows and leakage of the thermo-sensitive liquid will, since the bellows no longer urge push-rod 74 toward hot seat disc 45, allow said push-rod unimpeded movement toward thermostat O-ring 95. This release of the force on valve spring 46 heretofore provided via push-rod 74 and piston screw 61 by said bellows 82 allows valve spring 46 to move hot seat disc 49, piston screw 61, piston 65 and push-rod 74 to the right, the structure being so dimensioned that the right-hand annular edge or rim of piston 65 will seat against output seat 85 prior to the abutting of push-rod 74 against O-ring 95. Thus, upon thermostat failure, a fluid-tight seal is formed between piston 65 and output seat disc 85 thereby preventing the flow of hot water from the fluid source into chamber 100, notwithstanding the fact that upon thermostat failure the hot seat disc 49 moves as far as it is able from hot seat 62. This is due, of course, to the fact that all hot water flowing into chamber 60 must, to reach chamber 100, pass through the interior of piston 65 and piston 65 has now formed a fluid-tight seal against output seat disc 85. The flow of hot water to any space existing between the outer diameter of piston 65 and the inner diameter of liner 45 is prevented by O-ring 110 and it will be seen that the flow of any fluid between chambers 35 and 36 is prevented by O-ring 111 and seal 112. The flow of cold water from chamber 36 into chamber 100 is also prevented by the movement of piston 65 to the right, this movement of the piston, as previously discussed, sealing chamber 36. Thus, the only fluid flow into chamber 100 will be that cold water flow past piston 65 from chamber 36 due to any small tolerance caused clearance between the larger outer diameter of piston 65 and the inner diameter of liner 45.

It will be seen that upon failure of the thermostat bellows 82 and the forming of a seal between piston 65 and output seating disc 85, there is no way that the system can be over-ridden so as to permit use prior to repair of the entire unit, and therefore the instant fail-safe valve may truly be termed fail-safe as distinguished from "fail-safe" valves presently known in the art which are susceptible to manual adjustment after bellows failure, allowing them to be used without thermostatic or fail-safe control.

While the principles of the invention have been described in connection with specific structure, it is to be clearly understood that this description is made only by way of example and not as a limitation to the scope of the invention as set forth in the objects thereof and in the accompanying claims.

I claim:

1. A thermostatically controlled mixing valve comprising:

a valve housing formed with hot and cold fluid input orifices and a fluid output orifice for mixing said hot and cold fluids in said housing;

temperature sensing means positioned within said housing for sensing the temperature of fluid adjacent said output orifice;

first sealing means coupled to said temperature sensing means;

rod means coupled at a first end thereof to said temperature sensing means and adapted to be moved reciprocally thereby in response to fluid temperature variations sensed by said sensing means;

second sealing means coupled to said rod means at a second end thereof and adapted to prevent fluid flow between said input and output orifices in response to movement of said rod means in a first direction and to allow fluid flow between said input and output orifices in response to movement of said rod means in a second direction opposite said first direction;

piston means coupled to said second sealing means and positioned between said first and second sealing means,
    said piston means being formed with a fluid flow path therein and adapted to receive the fluid passed by said second sealing means at a first end thereof and to emit said passed fluid at a second end thereof; and drive means coupled to said second sealing means adapted to urge said piston means in said second direction to abut said first sealing means upon failure of said sensing means, thereby preventing the emission of said passed fluid from said second end of said piston means.

2. A thermostatically controlled valve, according to claim 1, further comprising:

first dividing means separating said input orifice into hot and cold fluid ports; and retainer means having a cavity and first, second and third apertures formed therein positioned in said housing, said second sealing means and said piston means positioned in said retainer means cavity.

3. A thermostatically controlled valve, according to claim 2, further comprising second dividing means positioned within said housing between said retainer means and said first dividing means providing a hot fluid path between said hot fluid port and said first aperture and a cold fluid path between said cold fluid port and said second aperture.

4. A thermostatically controlled valve, according to claim 3, wherein said second sealing means is positioned adjacent said first aperture and said second end of said piston means is positioned adjacent said third aperture.

5. A thermostatically controlled valve, according to claim 4, wherein said piston means comprises first and second peripheral members joined one to the other, said first member having greater periphery than said second member thereby forming a shoulder at the junction of said members, said shoulder being positioned to slide reciprocally adjacent said second aperture.

6. A thermostatically controlled valve, according to claim 5, wherein said first and second peripheral members are so dimensioned relative to said cavity that said first peripheral member is adjacent said second aperture thereby sealing said second aperture when said piston means is moved in said second direction and said second peripheral member is adjacent said second aperture thereby opening said second aperture when said piston means is moved in said first direction.

7. A thermostatically controlled valve, according to claim 6, wherein said piston means has an annular cross-section and a portion of said rod means is positioned within the fluid flow path formed therein, said retainer means has an annular cross-section, the inner diameter of said retainer means being equal to the outer diameter of said first peripheral member, and said second drive means comprises a spring coupled between said housing and said second sealing means.

8. A thermostatically controlled valve, according to claim 7, wherein said piston means is a hollow cylinder and the plane of the second end thereof is parallel to the plane of said third aperture, and said retainer means is cup-shaped, said first aperture being a circular bore in the base of said retainer means, said second aperture being an annular passageway intermediate the ends of said retainer means, and said third aperture being the open end of said retainer means.

* * * * *